United States Patent [19]

Terauchi et al.

[11] Patent Number: 5,004,800
[45] Date of Patent: Apr. 2, 1991

[54] AROMATIC POLYTHIOETHERIMIDE

[75] Inventors: Makoto Terauchi; Chikako Ikeda; Mitsutoshi Aritomi, all of Ibaraki, Japan

[73] Assignee: Mitsubishi Petrochemical Co., Ltd., Tokyo, Japan

[21] Appl. No.: 204,278

[22] Filed: Jun. 9, 1988

[30] Foreign Application Priority Data

Jun. 12, 1987 [JP] Japan .................. 62-146754

[51] Int. Cl.$^5$ .................. C08G 69/26; C08G 69/28
[52] U.S. Cl. .................. 528/351; 528/353
[58] Field of Search .................. 528/353, 351

[56] References Cited

U.S. PATENT DOCUMENTS 4,168,366  9/1979  D'Alelio .................. 528/353
4,783,522  11/1988  Aritomi .................. 528/352

FOREIGN PATENT DOCUMENTS 0213573  3/1987  European Pat. Off. .
6215228  7/1985  Japan .

*Primary Examiner*—Morton Foelak
*Assistant Examiner*—P. Hampton-Hightower
*Attorney, Agent, or Firm*—Oblon, Spivak, McClelland, Maier & Neustadt

[57] ABSTRACT

An aromatic polythioetherimide is disclosed, which comprises at least 50 mol % of a repeating unit represented by formula (I):

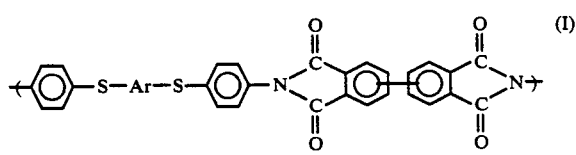

wherein Ar is as defined in the specification, with the total of the repeating unit(s) being 100 mol %. The polythioetherimide has an excellent balance between heat resistance and mechanical properties as well as improved moldability.

6 Claims, 2 Drawing Sheets

AROMATIC POLYTHIOETHERIMIDE

FIELD OF THE INVENTION

This invention relates to a novel aromatic polythioetherimide, and more particularly to an aromatic polythioetherimide which is excellent in heat resistance and can be melt-molded and is, therefore, useful as super-engineering plastics, heat resistant fibers, heat resistant film, materials for heat resistant coatings, and the like.

BACKGROUND OF THE INVENTION

It is well known that an aromatic polyimide having excellent heat resistance can be obtained by the reaction between an aromatic tetracarboxylic dianhydride and an aromatic diamine as described in C.E. Sroog, *Journal of Polymer Science*, Macromolecular Review, Vol. 11, page 161, (1976). However, the conventionally proposed aromatic polyimides have been limited in their application due to difficulty in melt-molding.

In order to improve melt-moldability, aromatic polyetherimides prepared by using an aryloxy acid dianhydride as acid dianhydride component have been studied, as disclosed, e.g., in Japanese Patent Publication Nos. 20966/82 and 20967/82, and have been put into the market under the trademark "ULTEM®" from General Electric Company. The aromatic polyetherimides of this type are excellent in melt-moldability (e.g., injection moldability and extrusion moldability) but, in turn, inferior in heat resistance and solvent resistance as compared with the conventional aromatic polyimides.

On the other hand, aromatic polyimides having melt-moldability without suffering great reduction of heat resistance have been reported, such as an aromatic polythioetherimide obtained by reacting an aromatic diamine having a (thio)ether linkage and pyromellitic dianhydride as disclosed in Japanese Laid-Open Patent Application Nos. 170122/84 and 250031/86, and a polyimidosulfone as disclosed in U.S. Pat. No. 4,398,021. They, however, are still unsatisfactory for practical application in the field of engineering and electronics where a balance between heat resistance and mechanical properties is required.

In order to eliminate these disadvantages of aromatic polyimides, Japanese Laid-Open Patent Application No. 15228/87 proposes an aromatic polythioetherimide obtained by the reaction between an aromatic diamine having a thioether linkage and 3,3',4,4'-benzophenonetetracarboxylic dianhydride and/or pyromellitic dianhydride. Although this aromatic polythioetherimide shows an excellent balance between heat resistance and mechanical properties, a further improvement on moldability has been demanded.

SUMMARY OF THE INVENTION

As a result of extensive investigations, the inventors have found that a novel aromatic polythioetherimide obtained by reacting an aromatic diamine having thioether linkages represented by formula (III):

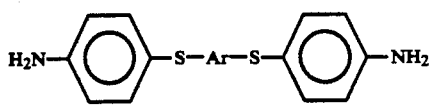

(III)

wherein Ar represents

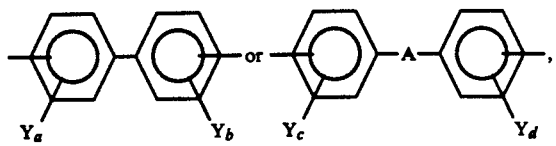

wherein A represents O, CO, SO, $SO_2$ or $C_yH_{2y}$, wherein y represents an integer of from 1 to 10; Y represents an alkyl group having from 1 to 20 carbon atoms, an aralkyl group having from 7 to 20 carbon atoms, a cycloalkyl group having from 3 to 20 carbon atoms, an aryl group having from 6 to 20 carbon atoms, a halogen atom or a nitro group; and a, b, c and d each represents 0 or an integer of from 1 to 4, and/or an aromatic diamine represented by formula (IV):

$$H_2N-Ar'-NH_2 \qquad (IV)$$

wherein Ar' represents a divalent aromatic residue represented by

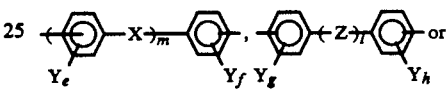

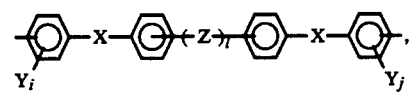

wherein Y is as defined above; e, f, g, h, i and j each represents 0 or an integer of from 1 to 4; X represents O or S; m represents 0 or an integer of from 1 to 20; l represents 0 or 1; and Z represents CO, SO, $SO_2$ or $C_yH_{2y}$, wherein y is as defined above, and a tetracarboxylic dianhydride represented by formula (V):

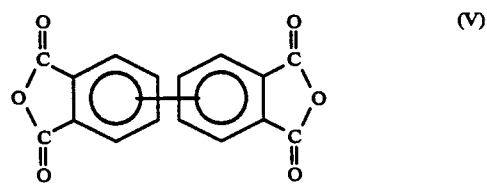

(V)

is well balanced between heat resistance and mechanical properties and also exhibits improved moldability. The present invention has been completed based on this finding.

That is, the present invention relates to a novel aromatic polythioetherimide having a repeating unit represented by formula (I):

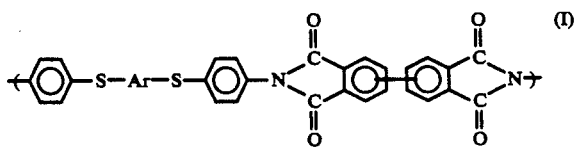

(I)

wherein Ar is as defined above.

More specifically, the present invention relates to an aromatic polythioetherimide comprising not less than 50 mol % of the repeating unit represented by formula (I), with the total of the repeating unit(s) being 100 mol %, and particularly to an aromatic polythioetherimide comprising almost 100 mol % of the repeating unit represented by formula (I), with the total of the repeating unit(s) being 100 mol %, and to an aromatic polythioetherimide comprising not less than 50 mol % of the repeating unit represented by formula (I) and up to 50 mol % of a repeating unit represented by formula (II):

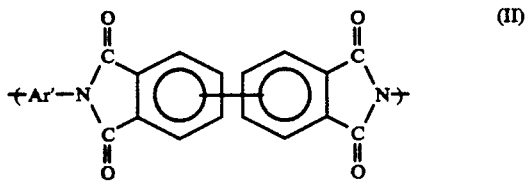

wherein Ar' is as defined above, with the total of the repeating units being 100 mol %.

DETAILED DESCRIPTION OF THE INVENTION

Figure 1:
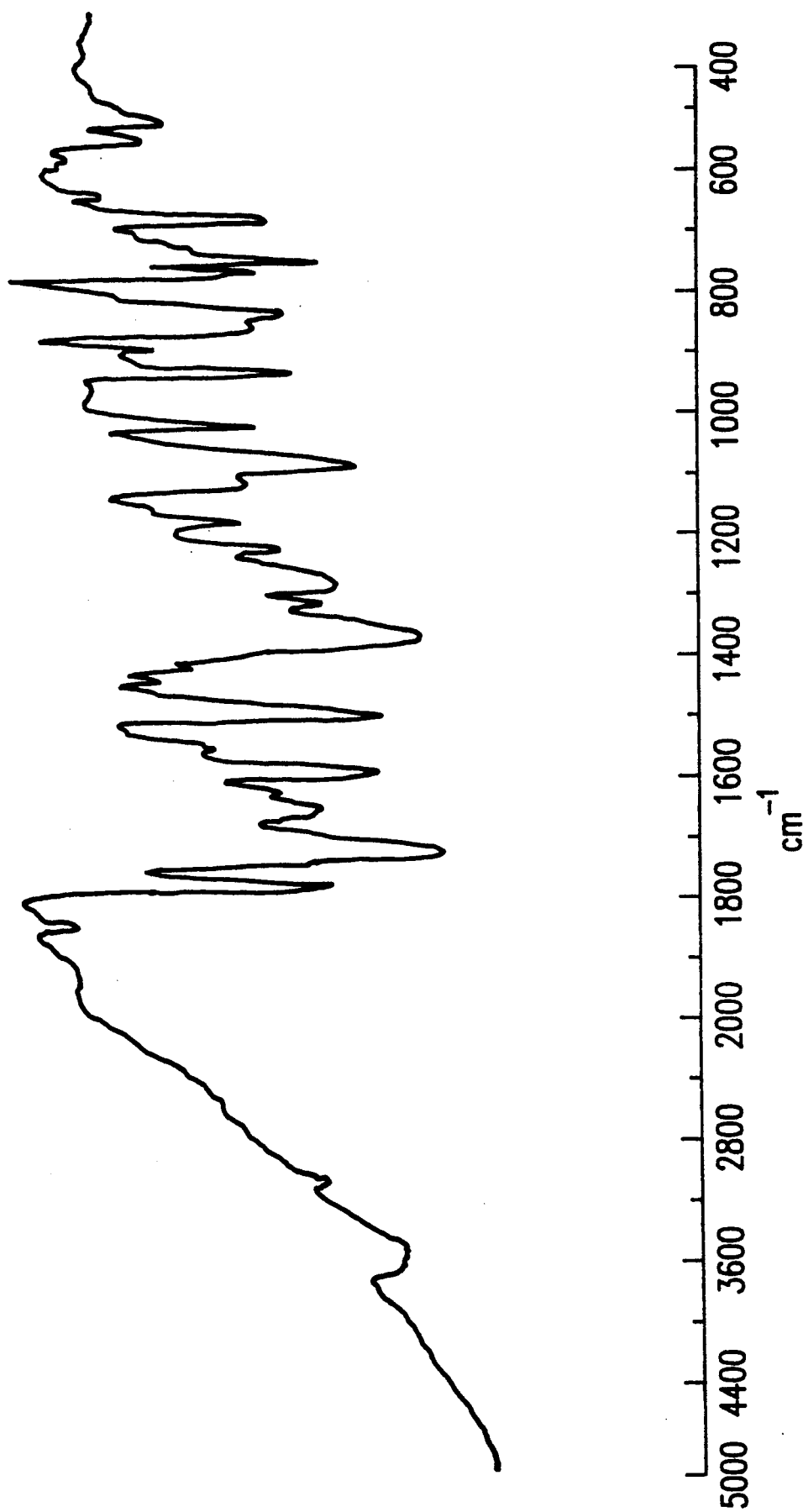
FIG. 1 is an infrared absorption spectrum of the aromatic polythioetherimide obtained in Example 1.

The aromatic polythioetherimides according to the present invention can be obtained by reacting (a) an aromatic thioether diamine represented by formula (III), and/or (b) an aromatic diamine represented by formula (IV), and (c) a biphenyltetracarboxylic dianhydride of formula (V) at a molar ratio [(a)+(b)]/(c) of 1/0.9 to 1.1 and a molar ratio (a)/(b) of 100/0 to 50/50.

The resulting aromatic polythioetherimide has a glass transition temperature of from 100° to 350° C., preferably from 120° to 280° C.

The reaction between the aromatic thioether diamine of formula (III) and, if used, the aromatic diamine of formula (IV) (these diamine compounds will hereinafter be inclusively referred to as aromatic diamine component) and the biphenyltetracarboxylic dianhydride of formula (V) is preferably carried out by the following one-stage process or two-stage process, but the process for preparing the aromatic polythioetherimide of the present invention is not limited thereto.

(1) One-Stage Process

This process comprises heating the aromatic diamine component and the carboxylic dianhydride in a dissolved or molten state to effect polymerization while removing produced water from the system to obtain a polyimide.

The one-stage process can be carried out by dissolving or dispersing 1.00 mol of the aromatic diamine component and 0.90 to 1.10 mol, preferably 0.95 to 1.05 mol, of the biphenyltetracarboxylic dianhydride in an organic solvent and heating the solution or dispersion at a temperature of from 100° to 400° C., preferably from 150° to 250° C. (solution process).

The reaction can be conducted effectively by using an azeotrope former serving for removal of water, such as benzene, toluene, xylene, chlorobenzene, etc., in combination. At the same time, addition of an organic acid, e.g., p-toluenesulfonic acid, benzene-sulfonic acid, etc., to the system as a catalyst sometimes brings good results.

The organic solvent which can be used in the above-described solution process includes halogenated aromatic hydrocarbons, e.g., dichlorobenzene, trichlorobenzene, etc.; phenolic compounds, e.g., phenol, cresol, chlorophenol, etc.; aliphatic carboxylic acids; aprotic polar solvents, e.g., N,N-dimethylacetamide, N-methylpyrrolidone, tetramethylurea, 1,3-dimethyl-2-imidazolidinone, sulforan, dimethyl sulfoxide, etc.; aliphatic glycol ethers, e.g., ethylene glycol dimethyl ether, diethylene glycol dimethyl ether, etc.; and mixtures thereof.

The one-stage process can also be carried out by mixing 1.00 mol of the aromatic diamine component and from 0.90 to 1.10 mol of the biphenyltetracarboxylic dianhydride and heating the mixture in a molten state at a temperature of from 150° to 400° C., preferably from 250° to 350° C. (melt process).

The polymerization according to the melt process can be accelerated by forced removal of produced water from the polymerization system.

(2) Two-Stage Process

This process comprises a first step comprising reacting the aromatic diamine component and the carboxylic dianhydride in a dissolved state to obtain a polyamic acid and a second step comprising dehydration-cyclization of the polyamic acid in a dissolved state or a solid phase state to obtain a polyimide.

(i) First Step (Preparation of Polyamic Acid)

The first step can be carried out by dissolving 1.00 mol of the aromatic diamine component and from 0.90 to 1.10 mol, preferably from 0.95 to 1.05 mol, of the biphenyltetracarboxylic dianhydride in a polar organic solvent and mixing the solution at a temperature of from −20° to +80° C., preferably from −10° to +60° C., to obtain a polyamic acid solution.

The polar organic solvent to be used in the first step includes aprotic polar solvents (e.g., N,N-dimethylformamide, N,N-dimethylacetamide, N-methylpyrrolidone, 1,3-dimethyl-2-imidazolidinone, sulforan, dimethyl sulfoxide, etc.); aliphatic glycol ethers (e.g., ethylene glycol dimethyl ether, diethylene glycol dimethyl ether, etc.); and mixtures thereof.

(ii) Second Step (Preparation of Polyimide)

The second step can be carried out by subjecting the polyamic acid obtained in the first step to dehydration-cyclization to convert it to an aromatic polythioetherimide. This step may be effected either in a liquid phase or in a solid phase.

The cyclization in a liquid phase includes thermal cyclization and chemical cyclization.

The thermal cyclization is performed by heating the polyamic acid solution at a temperature of from 50° to 400° C., preferably from 150° to 250° C. Addition of an azeotrope former serving for removal of produced water (e.g., benzene, toluene, xylene, chlorobenzene, etc.) and/or a catalyst (e.g., p-toluenesulfonic acid, benzene-sulfonic acid, etc.) to the reaction system gives good results.

The chemical cyclization is conducted by adding to the polyamic acid solution an aliphatic anhydride (e.g., acetic anhydride, propionic anhydride, etc.), a tertiary amine (e.g., triethylamine, pyridine, 4-dimethylaminopyridine, isoquinoline, etc.), a halogen compound (e.g., phosphorus oxychloride, thionyl chloride, etc.), a chemical dehydrating agent (e.g., Molecular Sieve, silica gel, alumina, phosphorus pentoxide, etc.), or the like and allowing the mixture to react at a temperature of from 0° to 120° C., preferably from 10° to 80° C.

The aromatic polythioetherimide resulted from the liquid phase cyclization may be obtained in a precipitated state or dissolved state. In the former case, the precipitate formed can be isolated by filtration. In the latter case, the resulting polymer solution is diluted with a solvent which is incapable of dissolving the polymer and compatible with the reaction solvent to thereby precipitate the polymer, which is then isolated by filtration.

The solid phase cyclization can be carried out by pouring the polyamic acid solution into water or methanol to precipitate the polymer, separating the polymer, and subjecting the polymer to heat treatment at a temperature of from 150° to 350° C. Cares should be taken not to heat the polymer for too long a period of time at a heating temperature of 250° C. or higher, since such heat treatment results in deterioration of melt flow properties or balance of mechanical properties.

Specific examples of the aromatic thioether diamine represented by formula (III) which can be used in the present invention are 4,4′-bis(4-aminophenylthio)biphenyl, 4,4′-bis(4-aminophenylthio)diphenyl ether, 4,4′-bis(4-aminophenylthio)benzophenone, 4,4′-bis(4-aminophenylthio)diphenyl sulfoxide, 4,4′-bis(4-aminophenylthio)diphenylsulfone, 3,3′-bis(4-aminophenylthio)diphenylsulfone, 2,2-bis[4-(4-aminophenylthio)phenyl]propane, 4,4′-bis(4-aminophenylthio)diphenylmethane, and so on.

These compounds can be used either individually or in combinations of two or more thereof. They are used in a total amount of from 50 mol % up to and including 100 mol % based on the total aromatic diamine component.

Specific examples of the aromatic diamine represented by formula (IV) which can be used in combination with the compound of formula (III) are p-phenylenediamine, m-phenylenediamine, tolylenediamine, 2-chloro-1,4-phenylenediamine, 4-chloro-1,3-phenylenediamine, 4,4′-diaminobiphenyl, 3,3′-dimethyl-4,4′-diaminobiphenyl, 3,3′-dichloro-4,4′-diaminobiphenyl, 4,4′-diaminodiphenyl ether, 3,4′-diaminodiphenyl ether, 4,4′-diaminodiphenyl sulfide, 4,4′-diaminodiphenylsulfone, 3,4′-diaminodiphenylsulfone, 3,3′-diaminodiphenylsulfone, 4,4′-diaminobenzophenone, 3,3′-diaminobenzophenone, 3,4′-diaminobenzophenone, 4,4′-diaminodiphenylmethane, 3,3′-diaminodiphenylmethane, 1,4-bis(4-aminophenoxy)benzene, 1,3-bis(4-aminophenoxy)benzene, 1,3-bis(3-aminophenoxy)benzene, 4,4′-bis(4-aminophenoxy)diphenyl ether, 1,4bis(4-aminophenylthio)benzene, 1,3-bis(4-aminophenylthio)benzene, 2,4-bis(4-aminophenylthio)nitrobenzene, 2,5-dimethyl-1,4-bis(4-aminophenylthio)benzene, 4,4′-bis(4-aminophenylthio)diphenyl sulfide, 1,4-bis[4-(4-aminophenylthio)phenylthio]benzene, an α,ω-diaminopoly(1,4-thiophenylene) oligomer, 4,4′-bis(4-aminophenoxy)biphenyl, 4,4′-bis(4-aminophenoxy)diphenyl sulfide, 4,4′-bis(4-aminophenoxy)benzophenone, 4,4′-bis(4-aminophenoxy)diphenylsulfone, 4,4′-bis(3-aminophenoxy)diphenylsulfone, 2,2-bis[4-(4-aminophenoxy)phenyl]propane, 2,2-bis[4-(3-aminophenoxy)phenyl]propane, etc. These compounds can be used either individually or in combinations of two or more thereof. They are used in a total amount of up to and including 50 mol % based on the total aromatic diamine component.

The biphenyltetracarboxylic dianhydride which can be used in the present invention includes 2,2′,3,3′-biphenyltetracarboxylic dianhydride, 2,3′,3,4′-biphenyltetracarboxylic dianhydride, 3,3′,4,4′-biphenyltetracarboxylic dianhydride, and a combination thereof.

In molding the polymer according to the present invention, the polymer can contain various known fillers. Typical examples of the fillers include fibrous fillers, e.g., glass fiber, carbon fiber, boron fiber, aramid fiber, alumina fiber, silicon carbide fiber, etc.; and inorganic fillers, e.g., mica, talc, clay, graphite, carbon black, silica, asbestos, molybdenum sulfide, magnesium oxide, calcium oxide, etc.

The polymer of the present invention can be used in a wide range of application, such as various electric and electronic parts, housings, automobile parts, interior materials of aircrafts, sliding parts, gears, insulating materials, heat resistant films, heat resistant varnishes, heat resistant fibers, and the like.

The present invention is now illustrated in greater detail with reference to the following Examples and Comparative Examples, but it should be understood that the present invention is not deemed to be limited thereto.

EXAMPLE 1

In a 1,000 ml-volume four-necked flask equipped with a thermometer, a water separator with a Dimroth condenser, an inlet for introducing a solid, and an inlet for introducing nitrogen gas were charged 42.8 g (0.10 mol) of 4,4′-bis(4-aminophenylthio)benzophenone and 200 ml of dried N-methylpyrrolidone. To the mixture was added 29.5 g (0.10 mol) of solid 3,3′,4,4′-biphenyltetracarboxylic dianhydride at 60° C. in a nitrogen stream while vigorously stirring. Thereafter, the stirring was continued at 60° to 70° C. for 2 hours and then at room temperature for 20 hours. The mixture was diluted with 100 ml of toluene and 100 ml of dried N-methylpyrrolidone followed by heating at 165° C. for 6 hours. During the reaction, the produced water was removed as an azeotropic mixture with toluene. The reaction mixture was cooled to room temperature and then poured into water to precipitate the produced polymer. The precipitate was filtered, crushed, washed with water, and dried in a vacuum drier at 180° C. for 24 hours to obtain 68.5 g (99.7%) of the polymer. The resulting polymer was insoluble in an organic solvent (N-methylpyrrolidone) and had a glass transition temperature of 233° C.

IR Spectrum (KBr) (shown in FIG. 1):
1,780 and 1,720 cm$^{-1}$ (imide), 1,650 cm$^{-1}$ (ketone), 1,080 cm$^{-1}$ (thioether), and 820, 760 and 740 cm$^{-1}$ (aromatic ring).

The polymer could be compression molded at 350° C. to provide a brown tough resin plate.

COMPARATIVE EXAMPLE 1

The same procedure of Example 1 was repeated, except for replacing the 3,3′,4,4′-biphenyltetracarboxylic dianhydride with 32.2 g (0.10 mol) of 3,3′,4,4′-benzophenonetetracarboxylic dianhydride, to obtain 71.0 g (99.4%) of a polymer insoluble in an organic solvent (N-methylpyrrolidone) and having a glass transition temperature of 245° C.

IR Spectrum (KBr):
1,775 and 1,720 cm$^{-1}$ (imide), 1,640 cm$^{-1}$ (ketone), 1,080 cm$^{-1}$ (thioether), and 820 and 720 cm$^{-1}$ (aromatic ring)

Although the resulting polymer could be compression molded to provide an amber tough resin plate, the temperature permitting of compression molding was 380° C., indicating inferiority in moldability to the polymer of Example 1.

EXAMPLE 2

The procedure of Example 1 was repeated, except for using, as starting materials, 40.0 g (0.10 mol) of 4,4'-bis(4-aminophenylthio)biphenyl and 29.5 g (0.10 mol) of 3,3',4,4'-biphenyltetracarboxylic dianhydride, to obtain 65.7 g (99.7%) of a polymer insoluble in an organic solvent (N-methylpyrrolidone) and having a glass transition temperature of 260° C. and a heat decomposition point of 520° C. (in air).

IR Spectrum (KBr):
1,780 and 1,720 cm$^{-1}$ (imide), 1,085 cm$^{-1}$ (thioether), and 810 and 740 cm$^{-1}$ (aromatic ring).

The resulting polymer could be compression molded at 370° C. to provide a brown tough resin plate.

EXAMPLE 3

In a 1,000 ml-volume four-necked flask equipped with a thermometer, an inlet for introducing a solid, a dropping funnel and an inlet for introducing nitrogen gas were charged 34.3 g (0.08 mol) of 4,4'-bis(4-aminophenylthio)benzophenone, 4.0 g (0.02 mol) of 4,4'-diaminodiphenyl ether, and 150 ml of dried N-methylpyrrolidone. To the mixture was added 29.5 g (0.10 mol) of 3,3',4,4'-biphenyltetracarboxylic dianhydride in a nitrogen stream while maintaining the inner temperature at 30° C. or lower, followed by stirring at room temperature for 20 hours. After the reaction mixture was diluted with 600 ml of dried N-methylpyrrolidone, 8.1 ml (0.10 mol) of pyridine and 45.3 ml (0.41 mol) of acetic anhydride were added thereto dropwise from the dropping funnel while maintaining the inner temperature at 70° C., followed by stirring at 70° C. for 2 hours. After cooling to room temperature, acetone was added to the reaction mixture, and the precipitated polymer was collected by filtration, washed with acetone, and dried in a vacuum drier at 180° C. for 24 hours to obtain 64.2 g (100%) of a polymer insoluble in an organic solvent (N-methylpyrrolidone) and having a glass transition temperature of 253° C.

Figure 2:
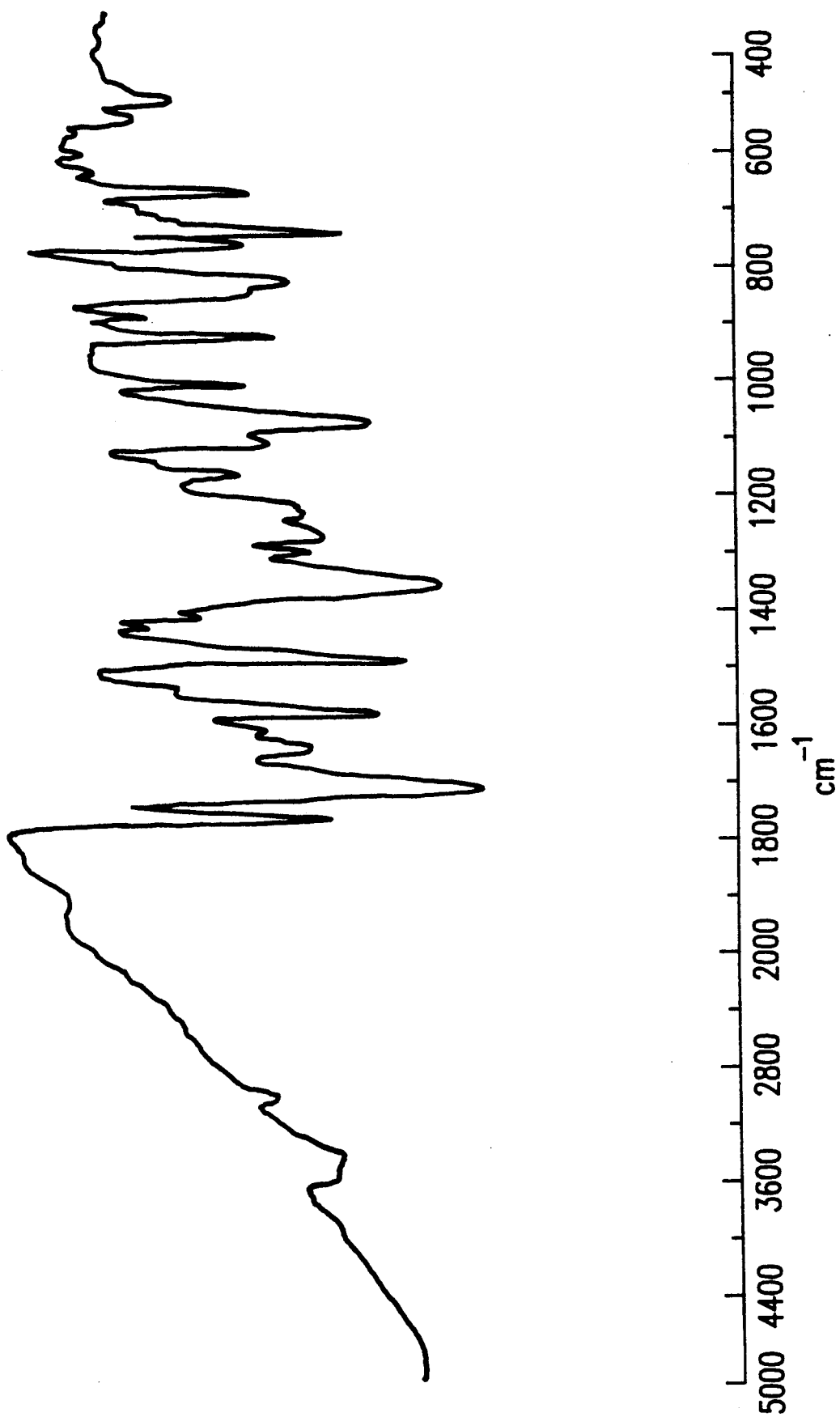
FIG. 2 is an infrared absorption spectrum of the aromatic polythioetherimide obtained in Example 3.

IR Spectrum (KBr) (shown in FIG. 2):
1,780 and 1,720 cm$^{-1}$ (imide), 1,240 cm$^{-1}$ (ether), 1,080 cm$^{-1}$ (thioether), and 825 and 740 cm$^{-1}$ (aromatic ring).

The resulting polymer could be compression molded at 360° C. to provide a pale brown and transparent resin plate. The molded polymer had a tensile strength (yield point) of 1.020 kg/cm$^2$ and a modulus of elasticity in tension of 27.600 kg/cm$^2$, proving extremely tough.

EXAMPLE 4

Into a 1,000 ml-volume four-necked flask equipped with a thermometer, a water separator with a Dimroth condenser, an inlet for introducing a solid and an inlet for introducing nitrogen gas were charged 34.3 g (0.08 mol) of 4,4'-bis(4-aminophenylthio)benzophenone, 4.0 g (0.02 mol) of 4,4'-diaminodiphenyl ether, 29.5 g (0.10 mol) of 3,3',4,4'-biphenyltetracarboxylic dianhydride, 0.1 g (0.00053 mol) of p-toluenesulfonic acid, and 650 ml of dried N-methylpyrrolidone, and the mixture was stirred at room temperature until the components were uniformly dissolved. To the mixture was added 100 ml of xylene, and the resulting mixture was heated at 180° C. for 6 hours. During the reaction, the produced water was azeotropically removed together with the xylene. After cooling to room temperature, the reaction mixture was poured into water, and the thus precipitated polymer was filtered, crushed, washed with water, and dried in a vacuum drier at 180° C. for 24 hours to obtain 63.8 g (99.4%) of a polymer insoluble in an organic solvent (N-methylpyrrolidone) and having a glass transition temperature of 255° C.

IR Spectrum (KBr):
1,780 and 1,720 cm$^{-1}$ (imide), 1,240 cm$^{-1}$ (ether), 1,080 cm$^{-1}$ (thioether), and 825 and 740 cm$^{-1}$ (aromatic ring).

The resulting polymer could be compression molded at 360° C. to provide a brown tough resin plate.

EXAMPLE 5

Into a 1,000 ml-volume four-necked flask equipped with a thermometer, a water separator with a Dimroth condenser, an inlet for introducing a solid, and an inlet for introducing nitrogen gas were charged 28.0 g (0.07 mol) of 4,4'-bis(4-aminophenylthio)biphenyl, 13.0 g (0.03 mol) of 4,4'-bis(4-aminophenoxy)diphenylsulfone and 150 ml of dried N-methylpyrrolidone. To the mixture was added 29.5 g (0.10 mol) of 3,3',4,4'-biphenyltetracarboxylic dianhydride in a nitrogen stream while keeping the inner temperature at 30° C., followed by stirring at room temperature for 20 hours. The reaction mixture was poured into water, and the thus precipitated polymer was filtered, crushed, washed with water, and dried in a vacuum drier at 70° C. for 24 hours to obtain a polyamic acid powder having an intrinsic viscosity of 0.45 dl/g (0.2% N-methylpyrrolidone solution, 30° C.).

IR Spectrum (KBr):
1,710 cm$^{-1}$ (carboxylic acid), 1,655 and 1,525 cm$^{-1}$ (amide), 1,240 cm$^{-}$(ether), 1,145 cm$^{-1}$ (sulfone), 1,085 cm$^{-1}$ (thioether), and 815 cm$^{-1}$ (aromatic ring).

The resulting polyamic acid powder was put in an oven and heated at 180° C. for 24 hours to effect imidization to obtain 66.7 g (99.7%) of a polymer insoluble in an organic solvent (N-methylpyrrolidone) and having a glass transition temperature of 272° C.

IR Spectrum (KBr):
1,780 and 1,720 cm$^{-1}$ (imide), 1,240 cm$^{-1}$ (ether), 1,150 cm$^{-1}$ (sulfone), 1,085 cm$^{-1}$ (thioether), and 815 and 740 cm$^{-1}$ (aromatic ring).

While the invention has been described in detail and with reference to specific embodiments thereof, it will be apparent to one skilled in the art that various changes and modifications can be made therein without departing from the spirit and scope thereof.

What is claimed is:

1. A melt-moldable aromatic polythioetherimide, comprising at least 50 mol % of a repeating unit having the formula (I):

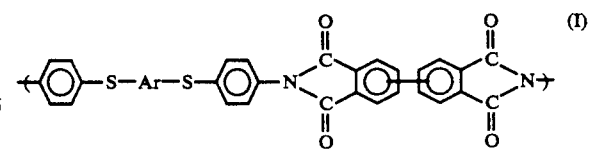

wherein Ar represents:

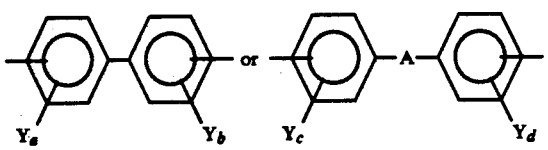

wherein A represents O, CO, SO, SO$_2$ or C$_y$H$_{2y}$, y represents an integer of from 1 to 10; Y represents an alkyl group having form 1 to 20 carbon atoms, an aralkyl group having from 7 to 20 carbon atoms, a cycloalkyl group having from 3 to 20 carbon atoms, an aryl group having from 6 to 20 carbon atoms, a halogen atom or a nitro group; and a, b, c and d each represents 0 or an integer of from 1 to 4, with the total of the repeating unit or units being 100 mol %.

2. The aromatic polythioetherimide as claimed in claim 1, wherein said aromatic polythioetherimide comprises up to 50 mol % of a repeating unit represented by the formula (II):

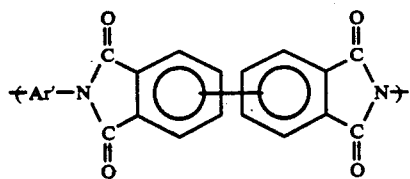

wherein Ar' represents a divalent aromatic residue represented by

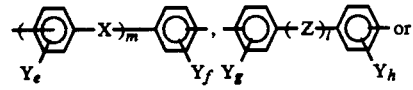

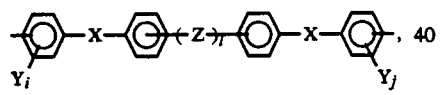

wherein Y is as defined in claim 1; e, f, g, h, i and j each represents 0 or an integer of from 1 to 4; X represents O or S; m represents 0 or an integer of from 1 to 20; l represents 1 or 1; and Z represents Co, So, SO$_2$ or C$_y$H$_{2y}$, wherein y is as defined in claim 1, with the total of the repeating units being 100 mol %.

3. The aromatic polythioetherimide as claimed in claim 1, which comprises substantially 100 mol % of the repeating unit of the formula (I).

4. The aromatic polythioetherimide as claimed in claim 1, which further comprises a fibrous filler selected from the group consisting of glass fiber, carbon fiber, boron fiber, aramide fiber, alumina fiber and silicon carbide fiber; and an inorganic filler selected from the group consisting of mica, talc, clay, graphite, carbon black, silica, asbestos, molybdenum sulfide, magnesium oxide and calcium oxide.

5. The aromatic polythioetherimide as claimed in claim 1, which comprises not less than 50 mol % of the repeating unit represented by the formula (I):

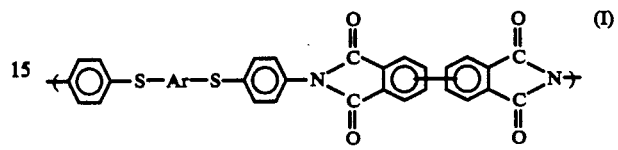

and up to 50 mol % of a repeating unit represented by the formula (II):

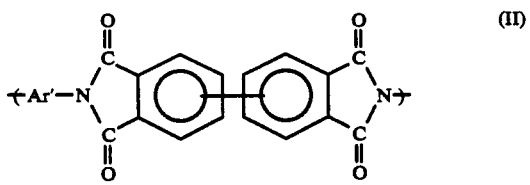

wherein Ar' represents a divalent aromatic residue represented by the formula:

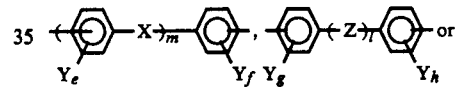

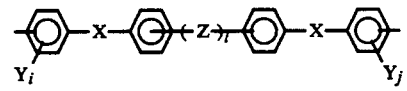

wherein Y is as defined in claim 1; e, f, g, h, i and j each represents 0 or an integer of from 1 to 4; X represents O or S; m represents 0 or an integer of from 1 to 20; l represents 0 or 1; and Z represents CO, SO, SO$_2$ or C$_y$H$_{2y}$, wherein y is as defined in claim 1, with the total of the repeating units being 100 mol %.

6. The aromatic polythioetherimide as claimed in claim 1, which has a glass transition temperature of from 100° to 350° C.

* * * * *